United States Patent
Monson et al.

(10) Patent No.: US 8,074,918 B1
(45) Date of Patent: Dec. 13, 2011

(54) UNMANNED AERIAL SYSTEM LAUNCH FROM WATER

(75) Inventors: Robert J. Monson, St. Paul, MN (US); Scott E. Morgan, St. Paul, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 367 days.

(21) Appl. No.: 12/436,441

(22) Filed: May 6, 2009

(51) Int. Cl.
*B64C 15/00* (2006.01)
(52) U.S. Cl. .................................................... 244/15
(58) Field of Classification Search ............ 244/3.1, 244/3.24, 15, 63, 12.1, 23 R; 102/399
See application file for complete search history.

(56) References Cited

U.S. PATENT DOCUMENTS

| 6,409,122 | B1 | 6/2002 | Nicolai |
| 7,097,136 | B2 * | 8/2006 | Ruszkowski, Jr. ............ 244/105 |
| 2006/0231677 | A1 * | 10/2006 | Zimet et al. ................. 244/17.23 |
| 2008/0219836 | A1 | 9/2008 | Decker et al. |
| 2008/0219841 | A1 | 9/2008 | Carl et al. |
| 2008/0219844 | A1 | 9/2008 | Decker et al. |

OTHER PUBLICATIONS

"Oregon Iron Works Successfully Completes First Auto-Landing Test of Sea Scout Unmanned Seaplane", May 8, 2006, UAVOnline.com.*
U.S. Appl. No. 12/467,385, filed May 18, 2009.

* cited by examiner

*Primary Examiner* — Timothy D Collins
*Assistant Examiner* — Nicholas McFall
(74) *Attorney, Agent, or Firm* — Hamre, Schumann, Mueller & Larson, P.C.

(57) ABSTRACT

An unmanned aerial system (UAS) is described that is operable on or in water, in addition to being able to fly in the air. The UAS can float in a body of water, or submerge itself underneath the water, and then later launch from the water without human intervention to perform a flying mission. The UAS can then return back to the water. The UAS incorporates an electric ducted fan acting as the propulsion engine for the UAS in the water as well as in the air.

8 Claims, 4 Drawing Sheets

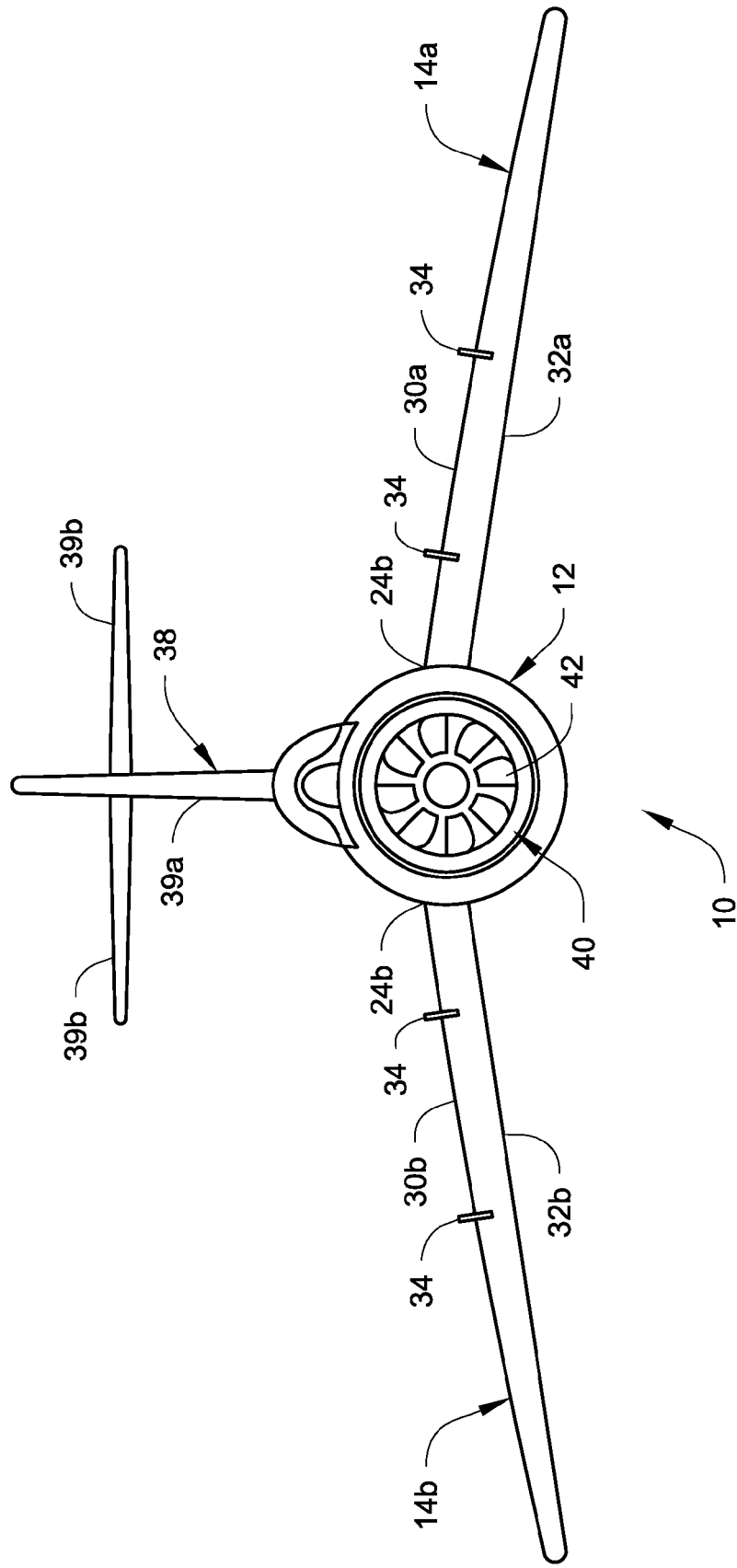

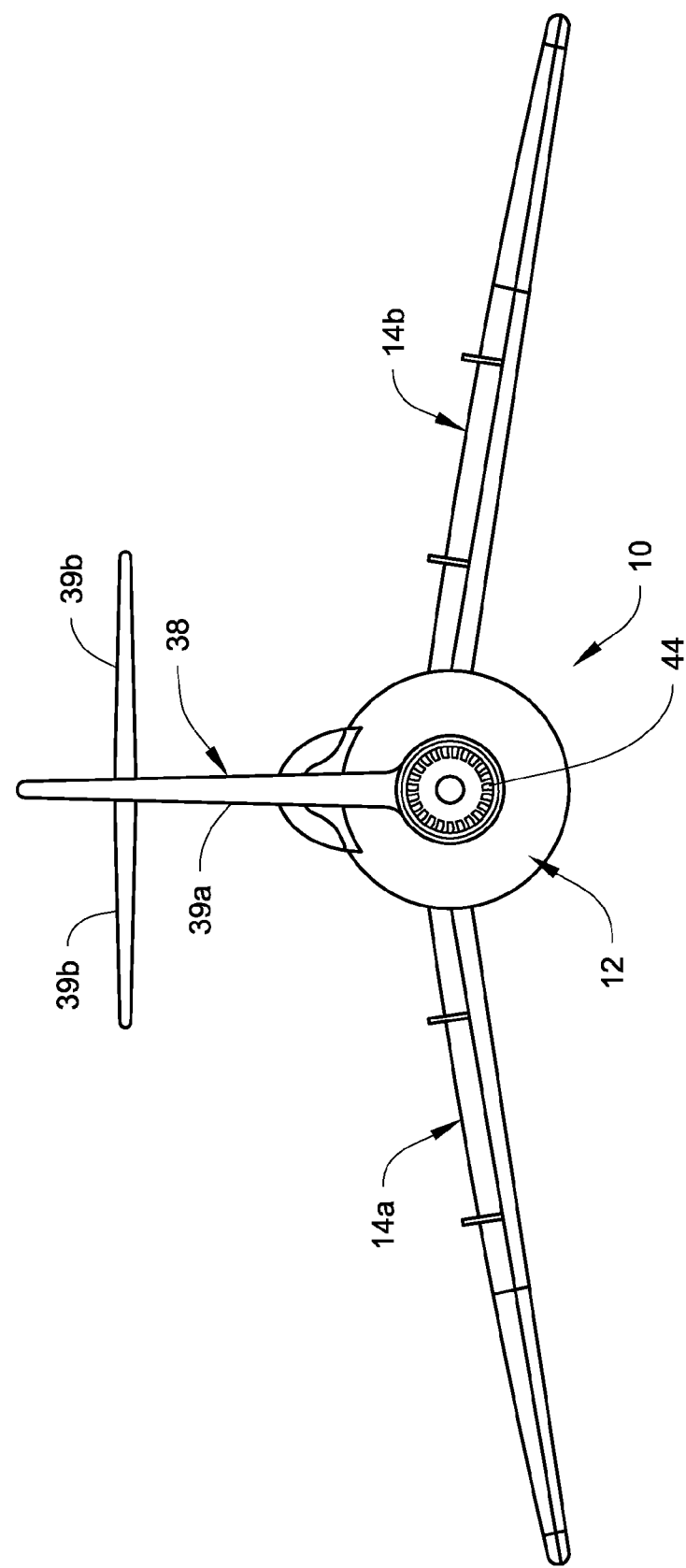

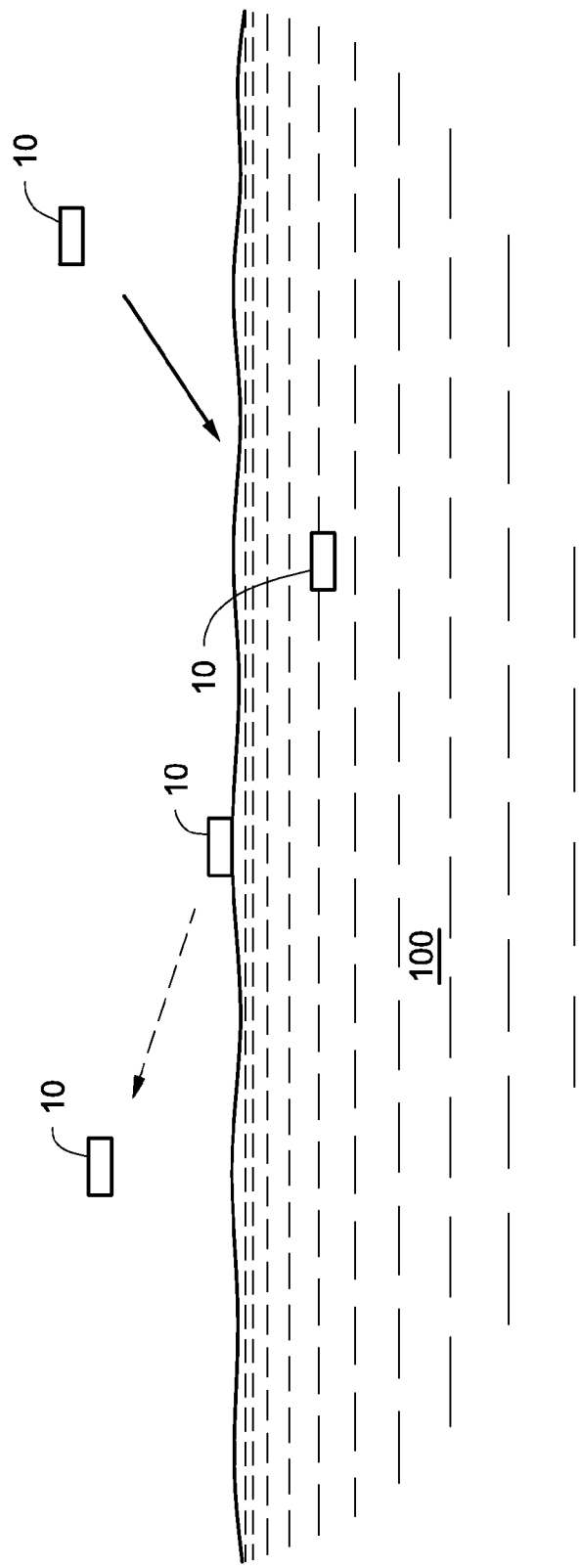

UNMANNED AERIAL SYSTEM LAUNCH FROM WATER

FIELD

Figure 1:
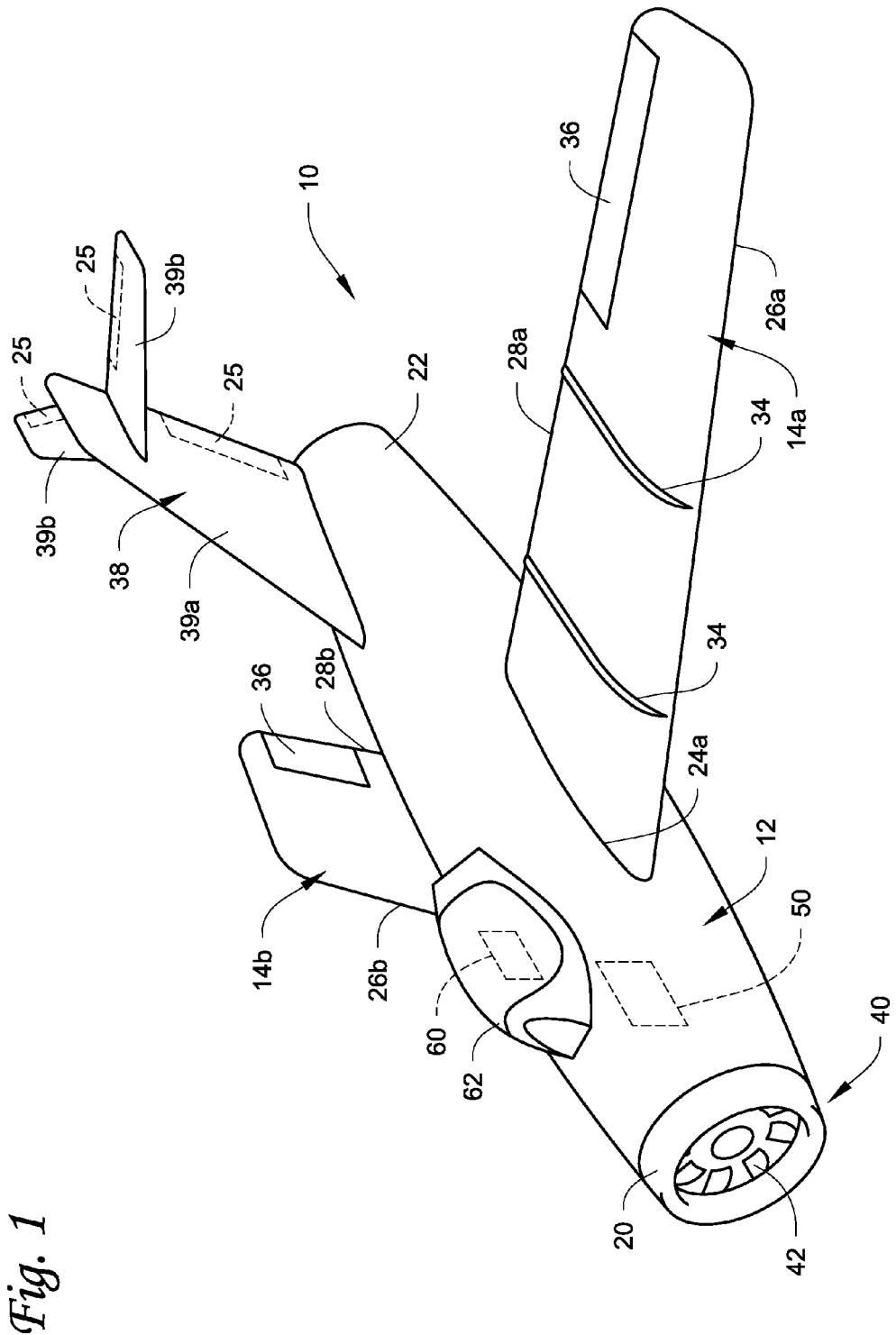

This disclosure relates an unmanned aerial system (UAS) that is operable in both air and in water.

BACKGROUND

In recent years, monitoring of global waterways has become increasingly important. Vehicles that are less conspicuous are often times useful for such monitoring. For example, some small unmanned aerial vehicles (UAVs) are useful for intelligence gathering, surveillance and reconnaissance roles in certain waterways. Conventional UAV's fly in the air and can contain various sensors that perform sensing operations. However, the endurance of UAV's is typically limited, which limits the use of UAV's on global waterways where the distances to be covered are immense, unless a tending ship from which the UAV is launched is present or the UAV is monitoring a waterway close to land.

SUMMARY

An unmanned aerial system (UAS) is described that is operable on or in water, in addition to being able to fly in the air. The UAS can float in a body of water, or submerge itself underneath the water, and then later launch from the water without human intervention to perform a flying mission. Upon completion of the mission, the UAS can then return to the water.

Submerging the UAS under the water allows the UAS to be hidden from view while waiting to perform its mission. When the UAS returns to the water, the UAS can recharge its power, for example using solar panels mounted on the aircraft, or if sufficient power remains, relaunch to perform another mission. Alternatively, the UAS can be allowed to sink to the bottom, essentially making the UAS disposable.

The UAS uses an engine that works effectively in both air and water, as well as in other fluids. For example, the engine can be an electric ducted fan. When disposed in water, the electric ducted fan engine will intake and expel water like a pump, driving the UAS through the water. To launch into the air, the UAS broaches the water's surface a sufficient distance to allow time for the engine to empty of water and speed up to allow rapid passage of air, thereby creating sufficient thrust for airborne flight.

In one embodiment, a method of operating an unmanned aerial system includes providing an unmanned aircraft with a fuselage, wings, and a ducted fan engine for propulsion. The unmanned aircraft, which can either float or be designed to sink, is disposed in water and the ducted fan engine is used to propel the unmanned aircraft in the water. The unmanned aircraft is then launched from the water and the ducted fan engine is used to propel the unmanned aircraft to fly through the air.

DRAWINGS

FIG. 1 is a perspective view of the submersible UAS.
FIG. 2 is a front view of the submersible UAS.
FIG. 3 is a rear view of the submersible UAS.
FIG. 4 is a schematic depiction of the submersible UAS submerged beneath the water, floating on the water, and launching from the water for flight in the air.

DETAILED DESCRIPTION

With reference to FIG. 1, a UAS 10 is illustrated as including a fuselage 12 and wings 14a, 14b. The fuselage 12 and wings 14a, 14b can be made of any materials used for UAV-type vehicles, including composite materials, for example carbon fiber composite, with a water-proof coating applied to the fuselage and wings if necessary to enable the materials to withstand exposure to water including salt water. Polyaramid can be added to certain areas for abrasion resistance and impact resistance or in the event of a crack in the composite structure to prevent catastrophic failure. These elements can be woven into a single cloth and then covered with a thin layer of E-glass yarn and matrix to prevent wicking of water into the substrate. Alternatively, a silicon conformal coating could be applied over the entire water exposed surfaces of the UAS.

The UAS 10 can be constructed so that it is buoyant and floats on the surface of the water, or constructed to submerge itself underneath the water.

The fuselage 12 is generally cylindrical in shape, with the diameter of the fuselage at a fluid intake end 20 being smaller than the diameter of the fuselage at a fluid discharge end 22. The UAS 10 generally resembles a MiG-15 jet fighter or a MiG-17 jet fighter in construction.

With reference to FIGS. 1-2, the wings 14a, 14b are attached to the fuselage 12 at root ends 24a, 24b. As shown in FIG. 2, the wings 14a, 14b in the illustrated embodiment have negative dihedral or anhedral. The wings also have a slight washout or twist from the root to the tip.

The wings 14a, 14b include leading edges 26a, 26b, trailing edges 28a, 28b, top surfaces 30a, 30b, and bottom surfaces 32a, 32b, respectively. In the illustrated embodiment, the wings also include wing fences 34, flaps 36, or any other control surfaces to facilitate water launching, water landing, steering in water, and flight attributes of the UAS 10. A T-tail 38 extends upwardly from the fuselage 12 near the rear thereof, which includes a vertical stabilizer portion 39a and a pair of horizontal stabilizer portions 39b extending from the vertical stabilizer portion 39a. If desired, the T-tail 38 can be provided with flaps 25 (illustrated in dashed lines) on either or both of the vertical stabilizer portion 39a and the horizontal stabilizer portions 39b to assist in directional control of the UAS 10 in the water and during flight.

Mounted in the fuselage 12 is a propulsion engine in the form of an electric ducted fan engine 40. The engine 40 is mounted axially in the fuselage 12 with the intake end at the fluid intake end 20 of the fuselage and discharges fluid toward and out the discharge end 22 at the rear of the fuselage.

The engine 40 includes an axial duct through which fluid flows, an impeller 42 or fan at the front end of the duct for drawing fluid into the duct and discharging the fluid toward the rear of the duct. Guide vanes 44 (visible in FIG. 3) disposed adjacent the rear of the duct de-swirl the fluid into a smoother axial flow before the fluid is discharged through the discharge end 22. The ducted fan engine 40 is driven by an electric motor (not shown) powered by one or more sources of electricity, such as a battery mounted in the UAS. A generally similar electric ducted fan engine is sold under the name Flurry 100™ available from Xcelaero Corporation of San Luis Obispo, Calif., or described in US 2008/0219836.

The UAS 10 also has a communication component 50 that is configured to provide communications to and from the UAS. In the illustrated embodiment the component 50 is mounted in the fuselage 12. However, the communication component 50 can be mounted at any location on or in the UAS 10, for example on or within the fuselage 12 or wings, to protect it from water. The communication component may be any device for transmitting and/or receiving data, for example, a transceiver, a transmitter, a transponder, etc. The communication component can be designed for wireless communication, such as infrared or radio frequency, including satellite communications. The communication component 50 can permit the UAS 10 to communicate with any remote location, for example a ship, another aircraft, or a land based location.

The UAS 10 also has a sensing system 60 for collecting data pertaining to its surroundings. In the illustrated embodiment, the sensing system 60 is mounted under a clear canopy 62 at the top of the fuselage 12 which protects the sensing system 60 from exposure to water and environmental conditions, while allowing the sensing system to sense outside of the UAS 10. However, the sensing system 60 can be disposed at any location(s) enabling the sensing system to perform it sensing function(s). The sensing system 60 can include one or more devices for detecting signals, sounds, light, acoustic contacts, etc., identifying location, measuring altitude, speed, bearing, damage, etc. and/or taking sound, chemical etc. samples of the surroundings. The sensing system 60 can also include one or more cameras for taking images. The sensing system 60 is connected to the communication component 50 so that the data gathered by the sensing system may be transmitted externally of the UAS. The UAS 10 can also include data storage capability so that the UAS stores gathered data which can be transmitted by the communication component or physically retrieved from the UAS.

The UAS 10 can include a location-determining device, for example a global positioning system (GPS), so that the UAS can relay its location via the communication component.

The UAS 10 also includes a control unit with a processor and memory storage. The memory storage can include programmable instructions for a monitoring mission of the UAS and control programs for controlling the operation of the UAS.

To protect components, for example the communication component and the sensing system, from water damage, the components can be encased in a suitable material, for example silicon elastomer.

In one exemplary use of the UAS 10 illustrated in FIG. 4, the UAS 10 flies to a waterway 100 and lands on the water. The UAS 10 then either floats or, for increased stealth, submerges itself in the water. The control surfaces of the UAS, for example the flaps 36, can be used to help achieve submersion as well as provide directional control in the water. Alternatively, the weight of the UAS 10 can be such that the UAS automatically submerges, at which point the UAS sinks to the bottom or remains submerged under the water using the propulsion from the engine 40 together with directional control (up, down, left and right) provided by the control surfaces.

While in the water, the UAS 10 can remain stationary to conserve power, or the electric ducted fan engine can be operated to propel the unmanned aircraft in the water. When the engine 40 is operated, water is drawn by the impeller 42 through the intake end 20 and discharged toward the rear and out through the discharge end 22. The discharge of the water propels the UAS 10 through the water.

When it is desired to launch the UAS 10 into the air, the UAS is accelerated underwater, and then directed generally straight up to eject the UAS clear of the water a sufficient distance to clear the engine of water and allow the engine rpm increase that will produce adequate thrust to propel the UAS and produce lift. The UAS can be provided with means to break water surface tension and at the same time reduce drag.

Once the water is expelled from the engine, the engine will speed up to an appropriate air-throughput since it is acting on the lower viscosity air, thereby creating thrust for flight. The engine will then act as the propulsion unit for achieving and maintaining flight. While flying, the UAS 10 can perform a sensing function, and communicate sensed information to a remote location and/or store sensed information internally.

When the mission is complete, the UAS 10 then returns back to the water where it floats or submerges itself. The UAS can recharge its power, for example using solar panels mounted on the wings and/or the fuselage or by other suitable electrical generation means, or if sufficient power remains, perform another mission. Alternatively, if the UAS is no longer needed, the UAS can be allowed to sink to the bottom, essentially making the UAS disposable.

The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of operating an unmanned aerial system, comprising:
   providing an unmanned aircraft with a fuselage and wings, the unmanned aircraft including an electric ducted fan engine for propulsion, the electric ducted fan engine is mounted axially in the fuselage and includes an axial duct with a front end defining a fluid intake, a rear end defining a fluid discharge, an impeller at the front end for drawing fluid into the axial duct, and guide vanes disposed adjacent to the rear end of the axial duct that de-swirl fluid before it is discharged through the fluid discharge, the electric ducted fan engine is driven by an electric motor;
   disposing the unmanned aircraft in water and using the electric ducted fan engine to propel the unmanned aircraft in the water; and
   launching the unmanned aircraft from the water and using the electric ducted fan engine to propel the unmanned aircraft to fly through the air.

2. The method of claim 1, wherein disposing the unmanned aircraft in water comprises submerging the unmanned aircraft in the water or having the unmanned aircraft float on the water.

3. The method of claim 1, wherein launching the unmanned aircraft comprises broaching the surface of the water so that the engine expels water therefrom permitting the engine to operate at a faster speed to propel the unmanned aircraft through the air.

4. The method of claim 1, further comprising the unmanned aircraft performing a sensing function, and communicating sensed information to a location remote from the unmanned aircraft.

5. The method of claim 4, wherein the unmanned aircraft performs the sensing function while disposed in the water or while flying in the air.

6. An unmanned aerial system comprising an aircraft body with a fuselage and wings, and an electric ducted fan engine for propulsion; the aircraft body capable of floating on the surface of water or sinking below the surface of the water; and the electric ducted fan engine being capable of operating in water and in air;
   the electric ducted fan engine is mounted axially in the fuselage and includes an axial duct with a front end defining a fluid intake, a rear end defining a fluid discharge, an impeller at the front end for drawing fluid into the axial duct, and guide vanes disposed adjacent to the rear end of the axial duct that de-swirl fluid before it is discharged through the fluid discharge; and an electric motor driving the electric ducted fan engine.

7. The unmanned aerial system of claim 6, wherein the aircraft body further includes a sensing system that is configured to perform a sensing function, and a communications system configured to communicate sensed information to a location remote from the unmanned aircraft.

8. The unmanned aerial system of claim 6, further comprising a horizontal stabilizer and a vertical stabilizer connected to the fuselage.

\* \* \* \* \*